Figure 1:
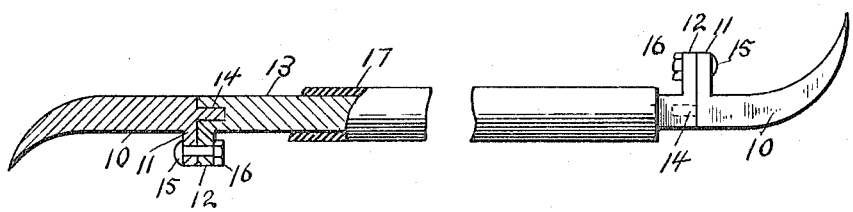

W. V. B. MARQUETTE.
INSULATED TOOL.
APPLICATION FILED MAR. 17, 1916.

1,197,138.

Patented Sept. 5, 1916.

William V. B. Marquette, Inventor.

By his Attorney,
W. P. Hutchinson.

UNITED STATES PATENT OFFICE.

WILLIAM V. B. MARQUETTE, OF YONKERS, NEW YORK.

INSULATED TOOL.

1,197,138.  Specification of Letters Patent.  Patented Sept. 5, 1916.

Application filed March 17, 1916. Serial No. 84,847.

*To all whom it may concern:*

Be it known that I, WILLIAM V. B. MARQUETTE, a citizen of the United States, and a resident of Yonkers, Westchester county, New York, have invented a new and useful Improvement in Insulated Tools, of which the following is a full, clear, and exact description.

My invention relates to improvements in insulated tools such as are used around electric third rails and other places where the tool is likely to come in contact with parts which are electrically charged. For such uses it is customary and necessary to insulate the handles of the tools so that the operator will not receive a shock. The insulation of the handles of such tools is usually the most expensive part of them, and as it is frequently necessary to repair the working parts of the tools, it happens that the handles are often injured or destroyed, and so a great expense is entailed in keeping the tools fit for use. To overcome this difficulty attempts have been made to have separable tools in which the separable parts are united by a screw thread, but this is often a serious objection for the reason that such tools usually require considerable strength, and a weakness develops at the joints. Moreover where a simple screw threaded joint connects the parts, the working ends or parts of the tools will often be twisted slightly and will not have the right relation to the handle.

The object of my invention is to overcome the above difficulties, and produce a tool in which the handle is separable from the other parts of the tool so that the parts which need repairing can be easily separated and repaired without injury to the handle; and further, to make the connection between the separable parts simple, inexpensive, and of such a character that the tool with its parts in place will be fully as strong as the ordinary tool which is not separable. By making the tool in this way the parts liable to injury can be repaired as often as is desirable without any danger of injuring the insulation of the handle, and the tool itself is as handy and useful as the ordinary solid tool. All of which will be clearly understood from the description which follows.

Reference is to be had to the accompanying drawings forming a part of this specification, in which similar reference characters indicate corresponding parts in all the views.

Figure 2:
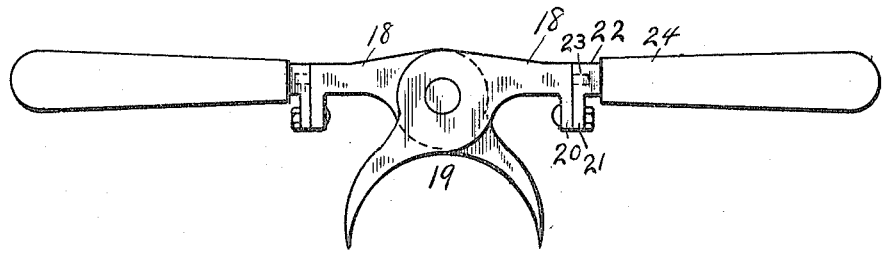
Figure 3:
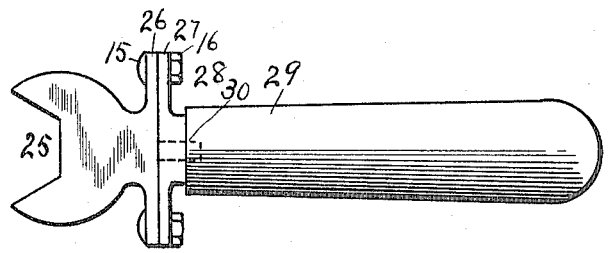

Figure 1 is a broken side elevation partly in section, of a pinch bar showing my improvements. Fig. 2 shows the application of my invention to a pair of tongs, and Fig. 3 shows the application of the invention to a wrench.

As shown in Fig. 1 the pinch bar has the end members 10 made like the end portions of the customary pinch bar, or they can be made in any preferred style or shape, and each member 10 has at its inner end a flange 11 which is flush with the inner end portion of said member, and the flange abuts with a corresponding flange 12 on the handle member 13, while a steadying pin 14 on the member 10 enters a corresponding socket on the handle member 13. The meeting flanges 11 and 12 are held together by a bolt 15 which passes through them and which can be tightened by means of a suitable nut 16. The handle is provided with insulation 17 which can be of any approved form.

It will be seen that by the arrangement shown and described the members 10 can be easily separated from the body portion or handle portion of the tool by simply unscrewing the nuts 16, and said members can be repaired and then easily put in place again. It will be further noticed that the flanges 11 and 12 together with the steadying pin 14, make the joint between the members 13 and 10 as strong as any part of the tool, and furthermore that the members 10 will always bear the right relation to the handle member 13.

It will be understood that this form of connection can be used on a great variety of tools between the handle portion or portions and the working parts of the tool. To illustrate this fact I have shown the application of the invention to several tools. For instance in Fig. 2 the invention is shown as applied to a pair of tongs of conventional type, but the tongs may be of any approved type. As illustrated the shanks 18 of the jaws 19 have end flanges 20 which abut with the flanges 21 of the handle members 22, and the steadying pins 23 in the ends of the shanks 18 enter corresponding sockets in the members 22, while these are provided with insulation 24. It will be noticed that this tool can be used as conveniently as any ordinary tongs, and that the flanges 20 and 21 are bolted together by bolts 15 and nuts 16 as already described, the jaws can be readily separated from the handles and repaired and replaced, and that the joint, as in the case of the pinch bar, is so strong that no weakness will develop in the tool.

Fig. 3 shows the application of the invention to a wrench, and the head 25 has on its shank opposed flanges 26 which abut with corresponding flanges 27 on the handle member 28. The handle member is covered with insulation 29, and the bolts 15 and nuts 16 are used as above described, while the steadying pin 30 on the wrench head enters a corresponding socket in the handle member. Fig. 3 shows a slight modification, however, in that a plurality of flanges are used on each abutting part instead of a single pair of flanges on the two parts.

The several illustrations bring out the fact that the invention is applicable to a great variety of tools, in fact to any tool having a handle, and it will be noticed that the joint is simple, strong, durable and cheap. Where tools are made in this way perfect insulation can be provided, and the insulated handles, which are expensive, will last a long time even though the working parts of the tool be frequently repaired, and as above stated, the working parts are always held in the right relation to the handle, which is important.

I claim:—

1. A tool of the character described comprising an insulated handle member, and a member separable from the handle member, the handle member and the second member having abutting flanges, a connecting pin, and means for securing the flanges together.

2. A tool of the character described comprising separable members meeting end to end and provided with abutting flanges, a steadying pin secured to one member and entering a socket in the other, and insulation on the member which serves as a handle.

3. A tool of the kind described having separable members one of which is covered with insulation, the members being arranged to meet end to end, abutting flanges on the two members, a pin connecting the meeting portions of the members, and means as a bolt and nut for securing the flanges together.

4. A tool of the character described comprising an insulated handle portion having a laterally extending flange flush with its end, a second member adapted to abut end to end with the handle member and having an end flange also abutting with the flange of the handle member, a steadying pin connecting the meeting portions of the two members, and means for fastening the meeting flanges together.

WILLIAM V. B. MARQUETTE.

Witnesses:
W. CHANTLER ARBUCKLE,
MARGUERITE V. MARQUETTE.

Copies of this patent may be obtained for five cents each, by addressing the "Commissioner of Patents, Washington, D. C."